(12) United States Patent
Honeycutt et al.

(10) Patent No.: US 11,701,953 B1
(45) Date of Patent: Jul. 18, 2023

(54) CONTAINER TARPING ASSEMBLY AND METHOD

(71) Applicant: Safe Rack LLC, Andrews, SC (US)

(72) Inventors: Robert W. Honeycutt, Pawleys Island, SC (US); Zachary James Long, Summerville, SC (US); Joseph N. Lane, Murrells Inlet, SC (US); Paul Thomas King, Jr., Florence, SC (US); Mark Frederick Ingersoll, Pawleys Island, SC (US); John Rutledge Lawson, Chapin, SC (US); Raquel Strickland, Sumter, SC (US)

(73) Assignee: SAFE RACK LLC, Andrews, SC (US)

( * ) Notice: Subject to any disclaimer, the term of this patent is extended or adjusted under 35 U.S.C. 154(b) by 8 days.

(21) Appl. No.: 17/523,593

(22) Filed: Nov. 10, 2021

Related U.S. Application Data

(60) Provisional application No. 63/112,127, filed on Nov. 10, 2020.

(51) Int. Cl.
  *B60J 7/08* (2006.01)
  *B60J 7/06* (2006.01)
  *B60P 7/04* (2006.01)

(52) U.S. Cl.
  CPC .............. *B60J 7/085* (2013.01); *B60J 7/068* (2013.01); *B60P 7/04* (2013.01)

(58) Field of Classification Search
  CPC ... B60J 7/061; B60J 7/062; B60J 7/068; B60J 7/085; B60J 7/12; B60J 7/102; B60J 7/10; B60P 7/04; B60P 7/02; B60P 7/00; B60P 7/0876

USPC ............. 296/100.11, 100.17, 100.18, 100.13
See application file for complete search history.

(56) References Cited

U.S. PATENT DOCUMENTS

| | | | |
|---|---|---|---|
| 364,034 A * | 5/1887 | Nye | B60J 7/062 296/105 |
| 4,844,109 A * | 7/1989 | Navarro | E04H 15/505 52/109 |
| 5,186,231 A * | 2/1993 | Lewis | E04F 10/0607 160/264 |
| 6,273,401 B1 | 8/2001 | Payne | |
| 6,502,709 B1 * | 1/2003 | Parker | B60J 7/102 212/328 |
| 6,857,620 B2 | 2/2005 | Payne | |
| 7,819,262 B1 * | 10/2010 | Ewan | B60P 7/0876 212/326 |
| 8,006,956 B2 | 8/2011 | Payne | |
| 8,534,592 B2 | 9/2013 | Payne | |
| 8,919,079 B2 * | 12/2014 | Payne | B65D 88/125 53/396 |

(Continued)

*Primary Examiner* — Joseph D. Pape
*Assistant Examiner* — Veronica M Shull
(74) *Attorney, Agent, or Firm* — Nelson Mullins Riley & Scarborough LLP

(57) ABSTRACT

A container tarping assembly comprises a frame structure. A left spreader assembly and a right spreader assembly adapted to carry a tarp are also provided. The left spreader assembly includes first and second left travelers. The right spreader assembly includes first and second right travelers. The travelers are each movable in reciprocating fashion along a predetermined path between a first limit and a second limit. A plurality of drive mechanisms are respectively associated with the travelers to move the traveler in the reciprocating fashion, each of the drive mechanisms having a bidirectional motor.

34 Claims, 16 Drawing Sheets

(56) References Cited

U.S. PATENT DOCUMENTS

2002/0149225 A1* 10/2002 Hornady ............... B60P 7/0876
                                                    296/100.01
2014/0117296 A1*  5/2014 Shrader ................ B60P 7/0876
                                                    254/338

* cited by examiner

CONTAINER TARPING ASSEMBLY AND METHOD

PRIORITY CLAIM

This application is based upon and claims the benefit of U.S. provisional application Ser. No. 63/112,127, filed Nov. 10, 2020, which is incorporated fully herein by reference for all purposes.

FIELD OF THE INVENTION

The present invention relates to an apparatus and methods utilized to apply a tarp to the open top of a container, such as truck trailer or rail car.

BACKGROUND OF THE INVENTION

Open-top containers, such as truck trailers and rail cars, are often used to carry certain types of particulate material, such as gravel or garbage. For example, the container may be filled with the material of interest at a loading station and then moved by highway or railway to the location of use or disposal. In order to inhibit loss of the material and potential damage to surrounding vehicles and the like, a tarp is often secured over the open top of the container before it is moved. The tarp thus serves as a cover for the container.

Because the tarps are large and heavy, and the open top of the container is relatively high, they are difficult to spread over the open top of the container. To facilitate the process of applying the tarp, mechanized tarp loaders have been developed. These tarp loaders usually have a frame structure carrying a pair of spaced apart lifting arms on which the tarp is spread. The lifting arms are then raised to a sufficient height for the container to be moved under the tarp. The lifting arms, which are laterally outside of the sidewalls of the container, are then lowered in order to rest the tarp on the container. (Note that the container will generally be full of particulate so the tarp will actually rest in part on the particulate itself) The tarp is then secured to the container so that it remains in position as the container is moved. Examples of prior art tarp loaders are shown in U.S. Pat. Nos. 8,006,956, 6,857,620, and 6,273,401, each of which is incorporated herein fully by reference in its entirety.

While some prior art tarp loaders have generally worked reasonably well, room for novel designs exists in the art.

SUMMARY OF THE INVENTION

The present invention recognizes and addresses the foregoing considerations, and others, of prior art construction and methods.

One aspect of the present invention provides a tarping assembly for applying a tarp to a container. The assembly comprises a first left upright and a first right upright spaced apart from each other. A second left upright and a second right upright spaced apart from each other are also provided. The first left upright is axially aligned with the second left upright and the first right upright is axially aligned with the second right upright such that the container may be received between the left and right uprights. The first left upright and the first right upright respectively have a first left traveler and first right traveler opposed to each other. In addition, the second left upright and the second right upright respectively have a second left traveler and second right traveler opposed to each other. The travelers are each movable in reciprocating fashion between a lower limit and an upper limit. A left spreader assembly is connected to the first left traveler and the second left traveler. A right spreader assembly is connected to the first right traveler and the second right traveler, the left and right spreader assemblies adapted to carry a tarp. At least one drive mechanism is configured to move the first left traveler, the first right traveler, the second left traveler, and the second right traveler in the reciprocating fashion.

In some exemplary embodiments, the at least one drive mechanism comprises respective drive mechanisms associated with the first left upright, the first right upright, the second left upright, and the second right upright. Each of the respective drive mechanisms may comprise a bidirectional motor and linkage arrangement, the linkage arrangement translating rotational movement into reciprocating linear movement of an associated one of the travelers. For example, the linkage arrangement of each drive mechanism may comprise a continuous chain extending around a pair of sprockets. The continuous chain of each drive mechanism may be located entirely within an associated one of the uprights.

In some exemplary embodiments, the tarping assembly may comprise upper and lower limit switches carried by each of the uprights, the limit switches operative to cut off power to the motor when engaged by the associated traveler. A common switching mechanism may be operative to initiate movement of all of the travelers away from an adjacent one of the limit switches.

In some exemplary embodiments, the left spreader assembly may comprise an elongate left spreader bar carrying a left hanger structure adapted to support the tarp. The right spreader assembly may comprise an elongate right spreader bar carrying a right hanger structure adapted to support the tarp. The left hanger structure and the right hanger structure may each comprise a taut line coated with an elastomeric material.

In some exemplary embodiments, a first cross-beam may connect the first left upright and the first right upright and a second cross-beam may connect the second left upright and the second right upright.

In some exemplary embodiments, the first left upright and the first right upright may define respective first left and first right slots in opposed surfaces thereof, the first left traveler being movable along the first left slot and the first right traveler being movable along the first right slot. The second left upright and the second right upright may define respective second left and second right slots in opposed surfaces thereof, the second left traveler being movable along the second left slot and the second right traveler being movable along the second right slot.

According to another aspect, the present invention provides a container tarping assembly comprising a frame structure. A left spreader assembly and a right spreader assembly adapted to carry a tarp are also provided. The left spreader assembly includes first and second left travelers. The right spreader assembly includes first and second right travelers. The travelers are each movable in reciprocating fashion along a predetermined path between a first limit and a second limit. A plurality of drive mechanisms are respectively associated with the travelers to move the traveler in the reciprocating fashion, each of the drive mechanisms having a bidirectional motor.

A still further aspect of the present invention provides a container tarping assembly comprising a frame structure including at least three U-shaped frame members axially aligned to define an open area in which a container to be tarped can be positioned. Also provided are a left spreader assembly and a right spreader assembly, each of which has first and second travelers between which a respective spreader bar extends. The travelers of the left and right spreader assemblies are movable in reciprocating fashion along a respective arcuate path along an associated one of the frame members between a first limit and a second limit, wherein the left spreader assembly and the right spreader assembly travel towards and away from each other along the arcuate paths. A carrier is operative to move the tarp onto the spreader assemblies.

Another aspect of the present invention involves a method comprising the step of providing a container tarping assembly having a frame structure as well as a left spreader assembly and a right spreader assembly adapted to carry a tarp. First and second left travelers are connected to the left spreader assembly. First and second right travelers are connected to the right spreader assembly. The travelers are each movable in reciprocating fashion along a predetermined path between a first limit and a second limit. A plurality of drive mechanisms are respectively associated with an associated one of the travelers to move the traveler in the reciprocating fashion, each of the drive mechanisms having a bidirectional motor. Another step of the method involves activating the motors in a first rotational direction so that the travelers move in a first longitudinal direction until the second limit is reached. The motors are activated in a second rotational direction so that the travelers move in a second longitudinal direction until the first limit is reached.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
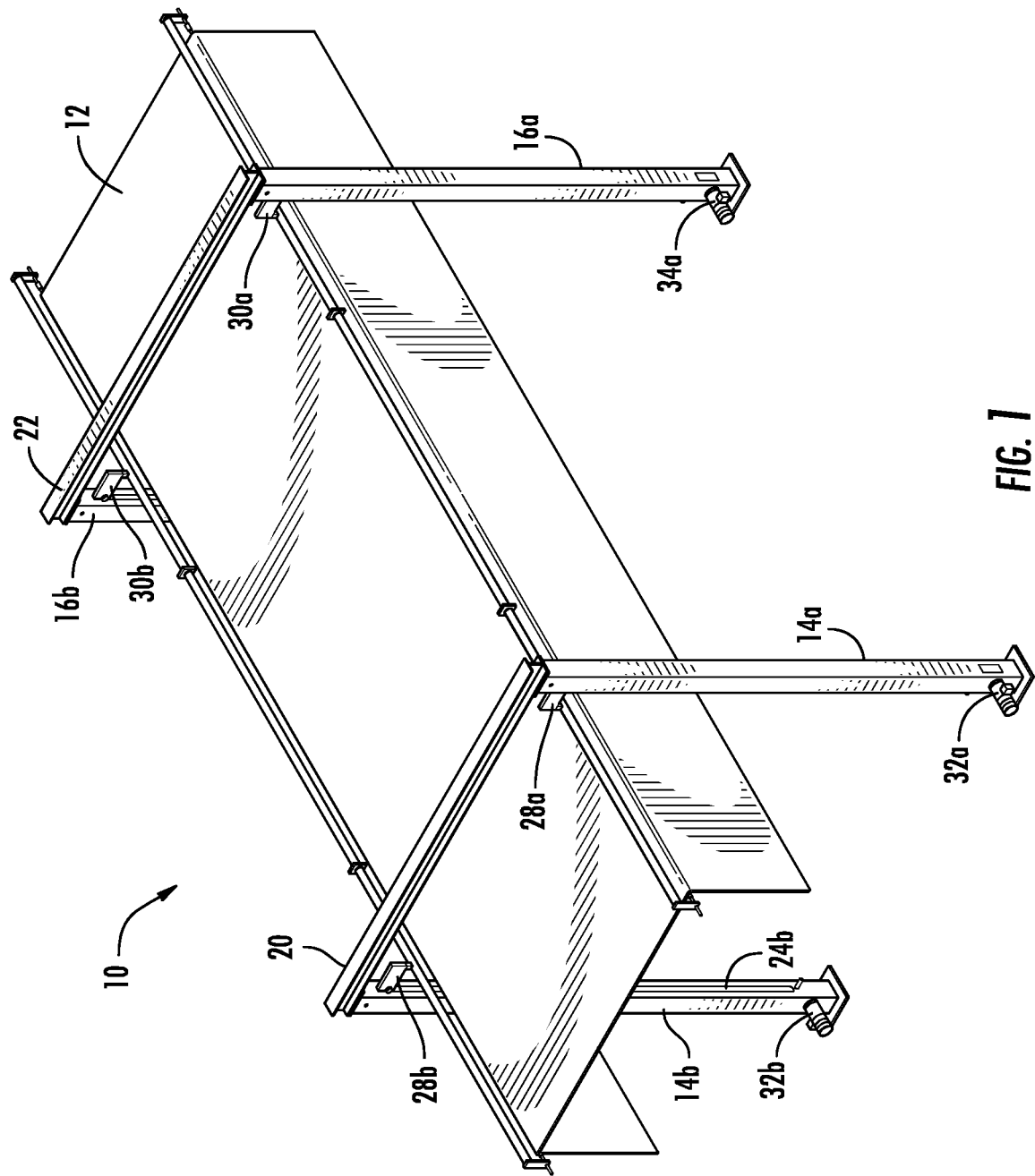
FIG. 1 is a perspective view of a container tarping assembly in accordance with an aspect of the present invention carrying a tarp in the raised position.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
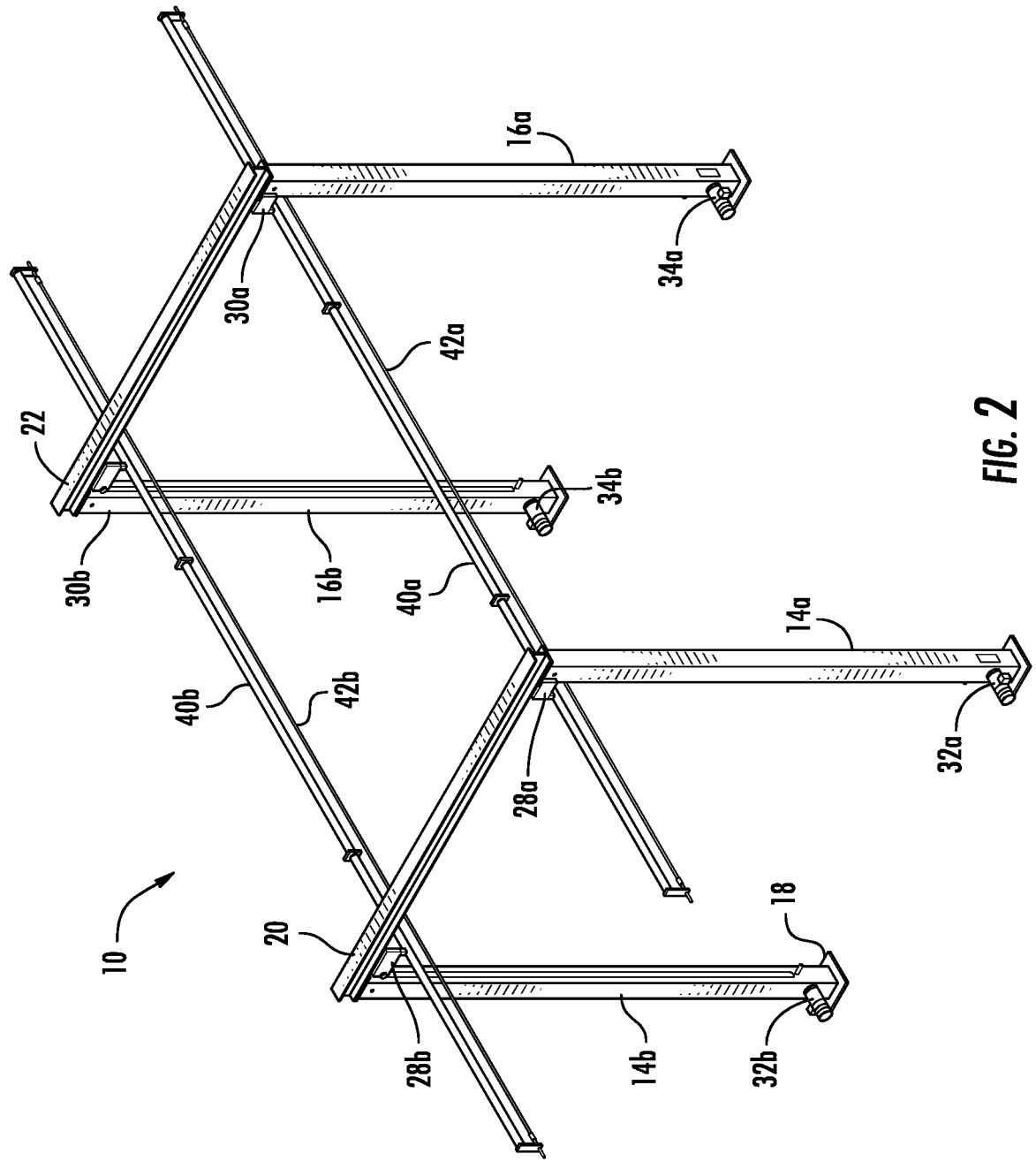
FIG. 2 is a perspective view similar to FIG. 1 without the tarp.

FIGS. 1 and 2 illustrate a container tarping assembly 10 in accordance with an embodiment of the present invention. As shown, assembly 10 comprises a frame of sufficient width and height to accommodate the container on which a tarp 12 is to be applied. In this embodiment, the frame comprises a pair of spaced-apart front uprights 14a-b and a pair of spaced-apart rear uprights 16a-b. Uprights 14a-b and 16a-b may be made from rectangular tubing material cut to the desired length, such as rectangular steel tubing. Preferably, the lower end of each upright is suitably attached to the ground surface. In this regard, each of the uprights 14a-b and 16a-b may have a rectangular plate, such as plate 18 (FIG. 2), located on its lower end. Collectively, the plates 18 serve as a base for the frame. Respective cross-beams 20 and 22 are attached to the upper end of opposed uprights 14a-b and 16a-b to provide structural rigidity. As can be seen, cross-beams 20 and 22 are in this embodiment formed from I-beams cut to the desired length. Preferably, cross-beams 20 and 22 may be made of the same material as the uprights (e.g., steel) and attached by any suitable method, such as welding. As one skilled in the art will appreciate, the frame may be part of a building into which the container is positioned for application of the tarp.

Figure 3:
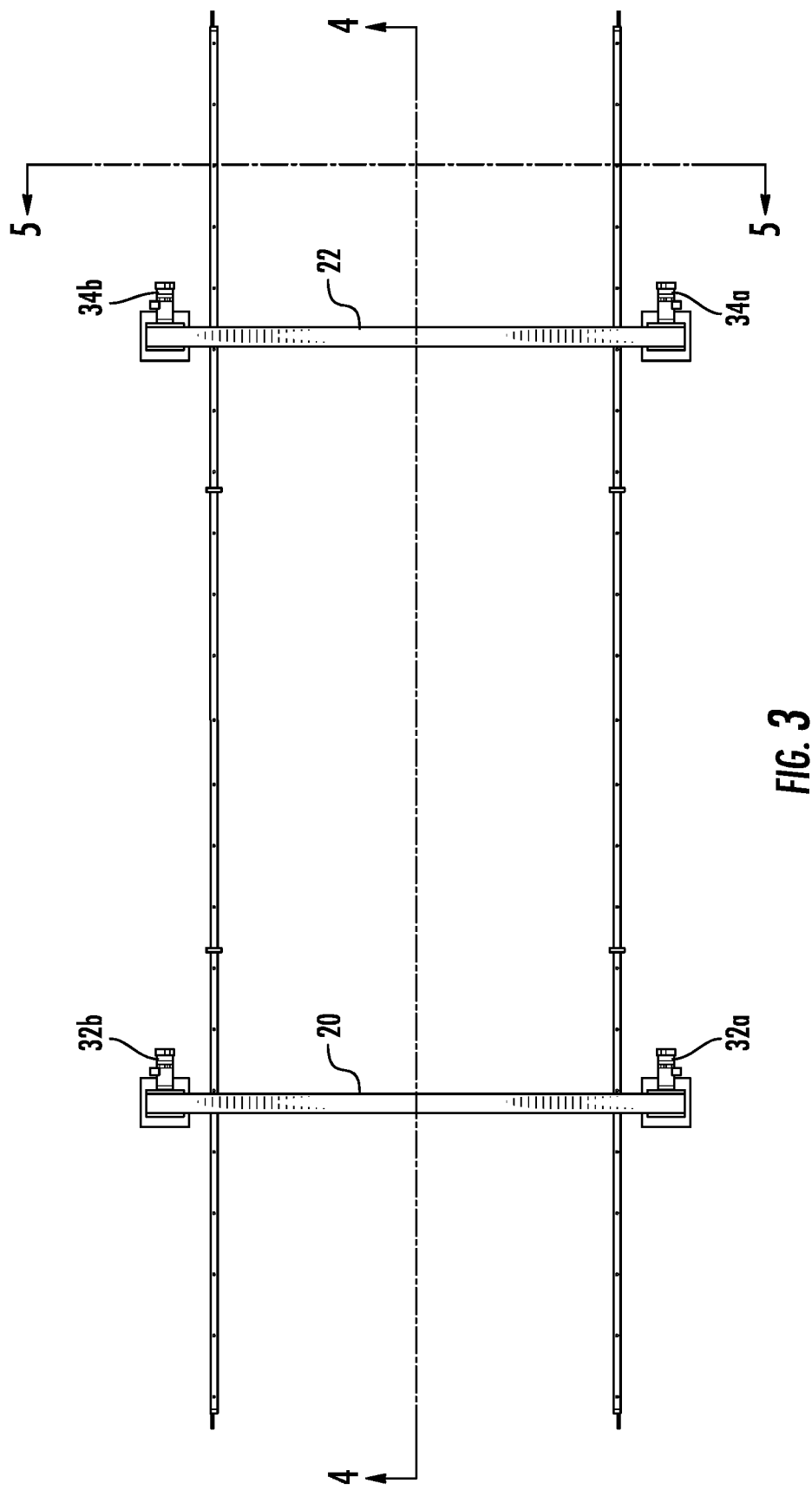
FIG. 3 is a top elevational view of the container tarping assembly of FIG. 1 without the tarp.
Figure 4:
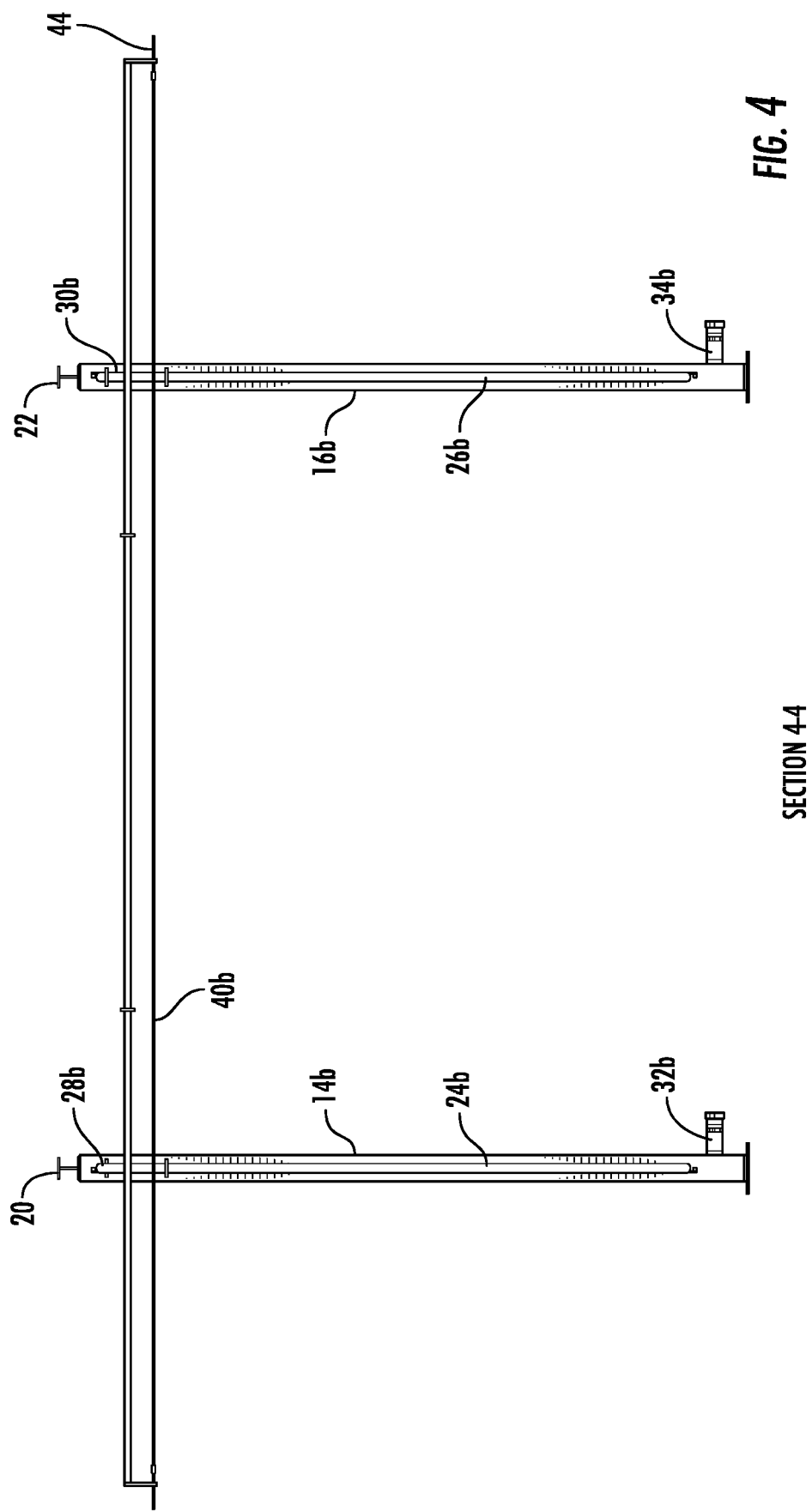
FIG. 4 is a cross-sectional view taken along line 4-4 of FIG. 3.
Figure 5:
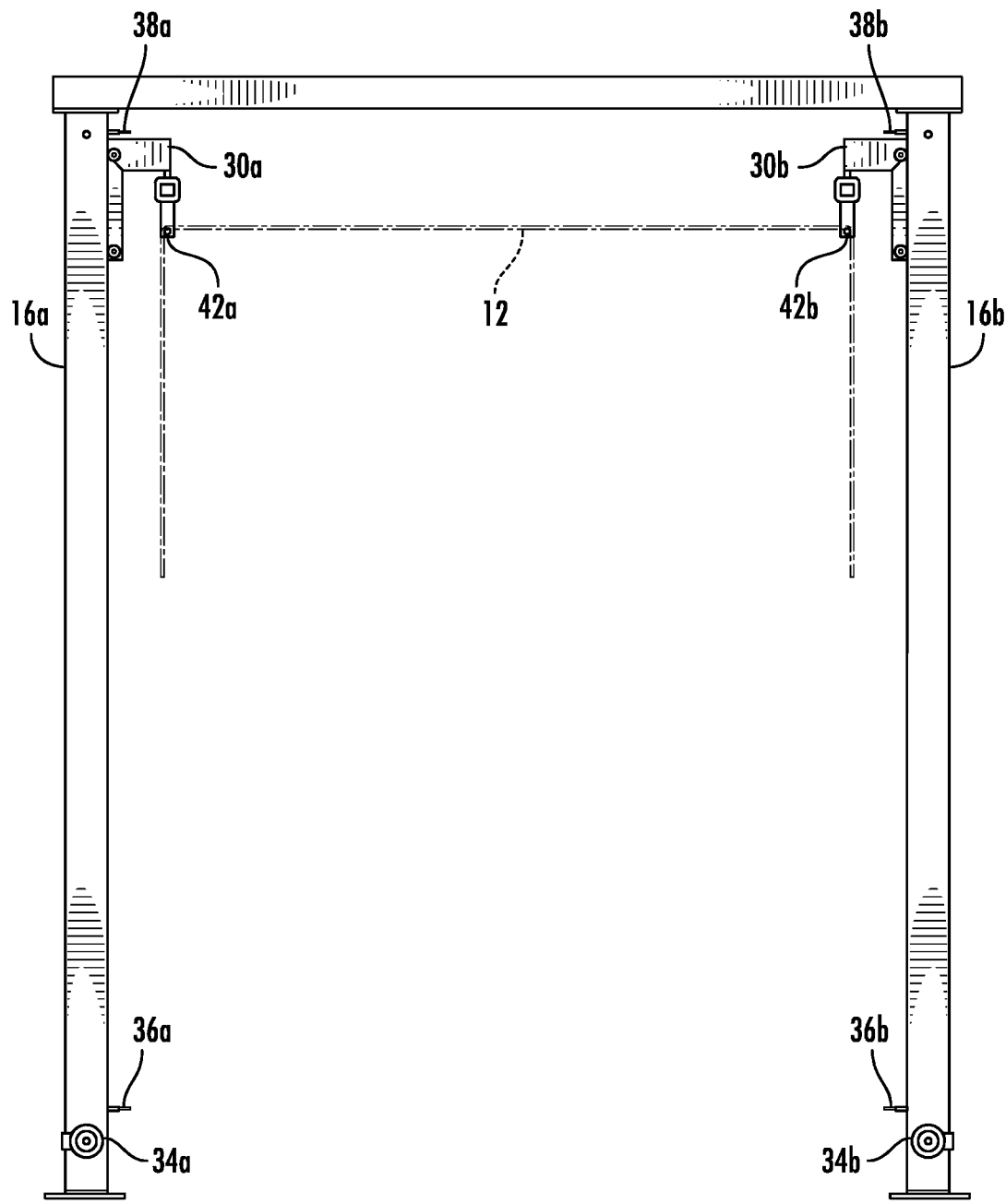
FIG. 5 is a cross-sectional view taken along line 5-5 of FIG. 3.

Referring now also to FIGS. 3-5, the inner (facing) surfaces on each of uprights 14a-b and 16a-b define therein a respective elongate slot, such as slots 24b and 26b. As will be explained more fully below, these slots allow reciprocating movement of a respective traveler 28a-b and 30a-b between lower and upper positions along the respective upright. The travelers are driven individually by a respective motor 32a-b and 34a-b. Motors 32a-b and 34a-b are attached to the respective upright near the lower end thereof with the drive shaft extending into the interior of the associated upright. Lower and upper limit switches, such as limit switches 36a, 38a and 36b, 38b (FIG. 5), stop the rotation of the associated motor in a respective direction to limit the stroke of the associated traveler.

First and second spreader bar assemblies carry the tarp as it lowered onto the open top of the container. Specifically, the spreader bar assemblies are connected to the travelers so that they move up and down as the travelers reciprocate. In this regard, the tarp 12 may be situated on the spreader bar assemblies when they are moved to a low position in order to be accessed by workers. After the tarp is suitably situated on the spreader bar assemblies, they may be raised such that the tarp will be in a high position permitting the container to be moved into the frame. The spreader bar assemblies may then be lowered so that the tarp will be draped over the open top of the container. After the tarp is separated from the spreader bar assemblies, it is typically secured to the container in a conventional manner so that the container can be transported to a different location.

In this embodiment, the first spreader bar assembly includes a first spreader bar 40a attached to the bottom of travelers 28a and 30a. Similarly, the second spreader bar assembly includes a second spreader bar 40b attached to the bottom of travelers 28b and 30b. As shown, spreader bars 40a and 40b extend beyond the uprights in forward and aft directions such that the overall length of each spreader bar exceeds the length of the tarp 12. In this embodiment, each of the spreader bars 40a-b is formed of three sections that are connected together to yield the overall length.

Each of the spreader bar assemblies includes, in this embodiment, a hanger structure on which the tarp 12 is actually carried. As shown, the hanger structure may comprise a taut line 42a-b, e.g., a length of braided metal cable, connected to ends of the respective spreader bar 40a or 40b. As a result, lines 42a-b will be located parallel to and below the associated spreader bar 40a or 40b. At least one tensioner 44 (FIG. 4) may be associated with each of lines 40a and 40b to ensure that they remain in sufficient tension.

The tarp 12 is thus simply draped over both of the lines 42a and 42b as clearly shown in FIG. 1. The weight of tarp 12 is generally sufficient to maintain it in the draped position, although lines 42a-b may preferably be coated with a suitable "sticky" polymer to contribute friction. If tarp 12 is nevertheless tending to shift, clips or the like may be used to maintain it in the correct position on lines 42a-b.

With specific reference to FIGS. 4 and 5, certain additional details regarding the operation of tarping assembly 10 can be most easily explained. As noted above, tarp 12 is positioned on lines 42a-b with travelers 28a-b and 30a-b at the location of the lower limit switches (e.g., switches 36a-b). The motors are then activated simultaneously so as to cause the travelers to move toward the upper limit switches (e.g., switches 38a-b), where the travelers will be stopped. Tarp 12 will thus be in the position shown in FIG. 5.

Figure 6:
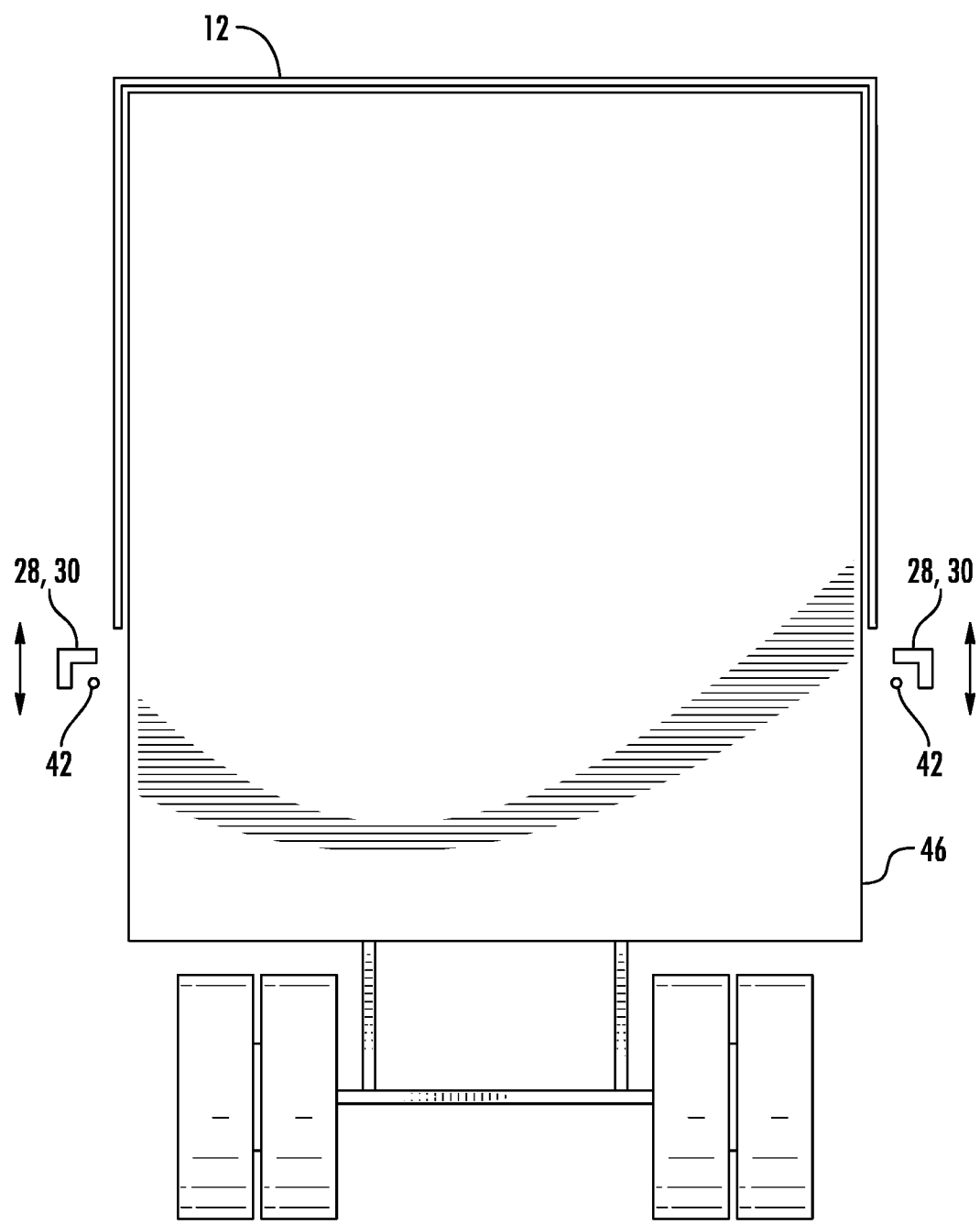
FIG. 6 is a diagrammatic representation showing the tarp lowered onto the open top of the container using the container tarping assembly of FIG. 1.

As shown in FIG. 6, travelers 28, 30 are then lowered alongside the container 46. Tarp 12 will thus encounter and be retained by the top of container 46 as travelers 28, 30 are lowered. When travelers 28, 30 are lowered enough, tarp 12 will be completely clear of lines 42 and will be covering the open top of container 46. Tarp 12 is then secured so that container 46 can be transported to a different location.

Figure 7:
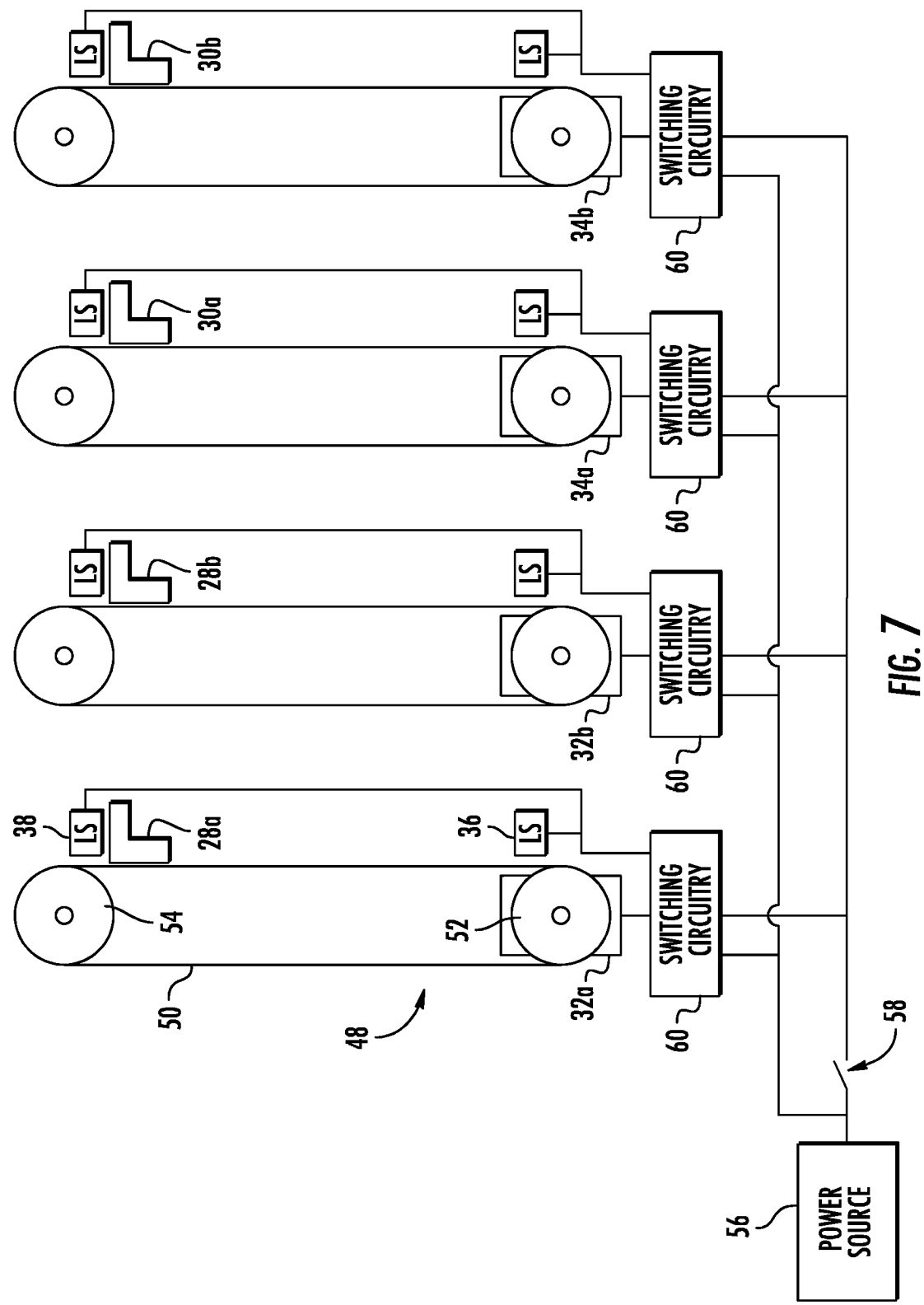
FIG. 7 is a diagrammatic representation showing mechanisms for raising and lowering the tarp in an embodiment of the container tarping assembly of FIG. 1.

Referring now to FIG. 7, the operation of motors 32, 34 as configured in this embodiment will be explained. In this regard, each of the motors is part of a suitable drive mechanism to cause the associated traveler to reciprocate in the slot (e.g., slots 24b, 26b) defined in the respective upright. For example, a drive mechanism 48 (which includes motor 32a) causes traveler 28a to move up and down. (One skilled in the art will appreciate that similar drive mechanisms will typically be associated with the other motors.) In this embodiment, drive mechanism 48 is configured as a chain drive having a continuous chain 50 extending around lower and upper sprockets 52 and 54. Traveler 28a is attached to the chain so that it moves linearly between limit switches 36 and 38. While a chain drive is used in this embodiment, one skilled in the art will appreciate that any suitable linkage arrangement for conveying a traveler, such as a threaded screw, may also be used.

As shown, a power source 56 and a common switch 58 are connected in this embodiment to each of the motors 32a-b and 34a-b through respective switching circuitry 60. Each of the motors is capable of rotation in either clockwise or counterclockwise directions in order to cause the reciprocation of the associated traveler. In this embodiment, switch 58 is a momentary switch (e.g., a spring-loaded contact switch) that, when closed, energizes the switching circuitry 60 associated with each motor. The switching circuitry 60 will then cause the motor to rotate in a direction so that the traveler moves away from whichever limit switch it is engaging when switch 58 is closed. The traveler will continue until it engages the opposite limit switch, at which time power to the motor will again be cut off. The process repeats when switch 58 is closed again, with the motors rotating in the opposite rotational direction so that the travelers will move in the opposite linear direction from the previous stroke.

Figure 8:
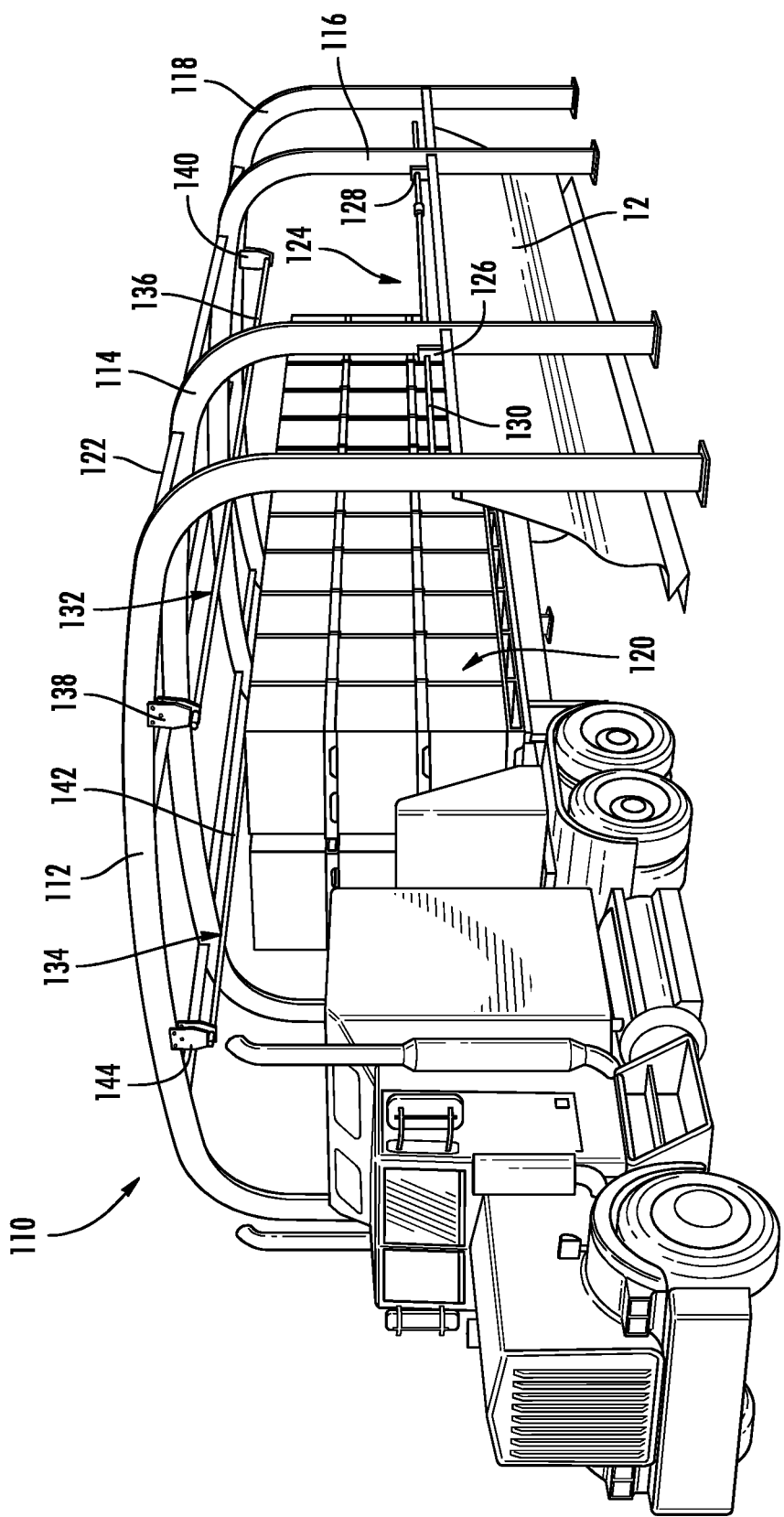
FIG. 8 is a front perspective view of a container tarping assembly in accordance with another embodiment of the present invention carrying a tarp to be positioned on a container.

Referring now to FIG. 8, a tarping assembly 110 in accordance with a further embodiment of the present invention is illustrated. In this embodiment, a frame is provided having four frame members 112, 114, 116, and 118 that are axially aligned to define an open area in which the container 120 can be positioned. As shown, the frame members may be substantially U-shaped and formed, for example, of steel I-beam or the like. For example, multiple I-beam sections may be connected to form each frame member, as necessary or desired. One more axial spacers, such as spacer rod 122, may be positioned between members 112, 114, 116, and 118 for further support. Like the previous embodiment, the frame may be part of a building into which the container is driven for tarping. For example, a water proof roofing member may be supported by the outer surface of the frame members to facilitate tarping in inclement weather and during wind.

A carrier 124 is provided to move the tarp 126 over the top of the container, starting at the initial position shown in FIG. 8. In this embodiment, carrier 124 comprises a pair of travelers 126 and 128 that move between first and second limits along frame members 114 and 116 respectively. A carrier bar 130 is rigidly connected to travelers 126 and 128 and extends axially inside of the frame members. In this embodiment, carrier bar 130, which may be formed of multiple bar sections connected together, has a length slightly less than the spacing between frame members 112 and 118. Carrier bar 130 may have suitable clips, hooks, or other attachment mechanisms to releasably attach tarp 12 so that it can be moved over the top of the container 120.

Figure 12:
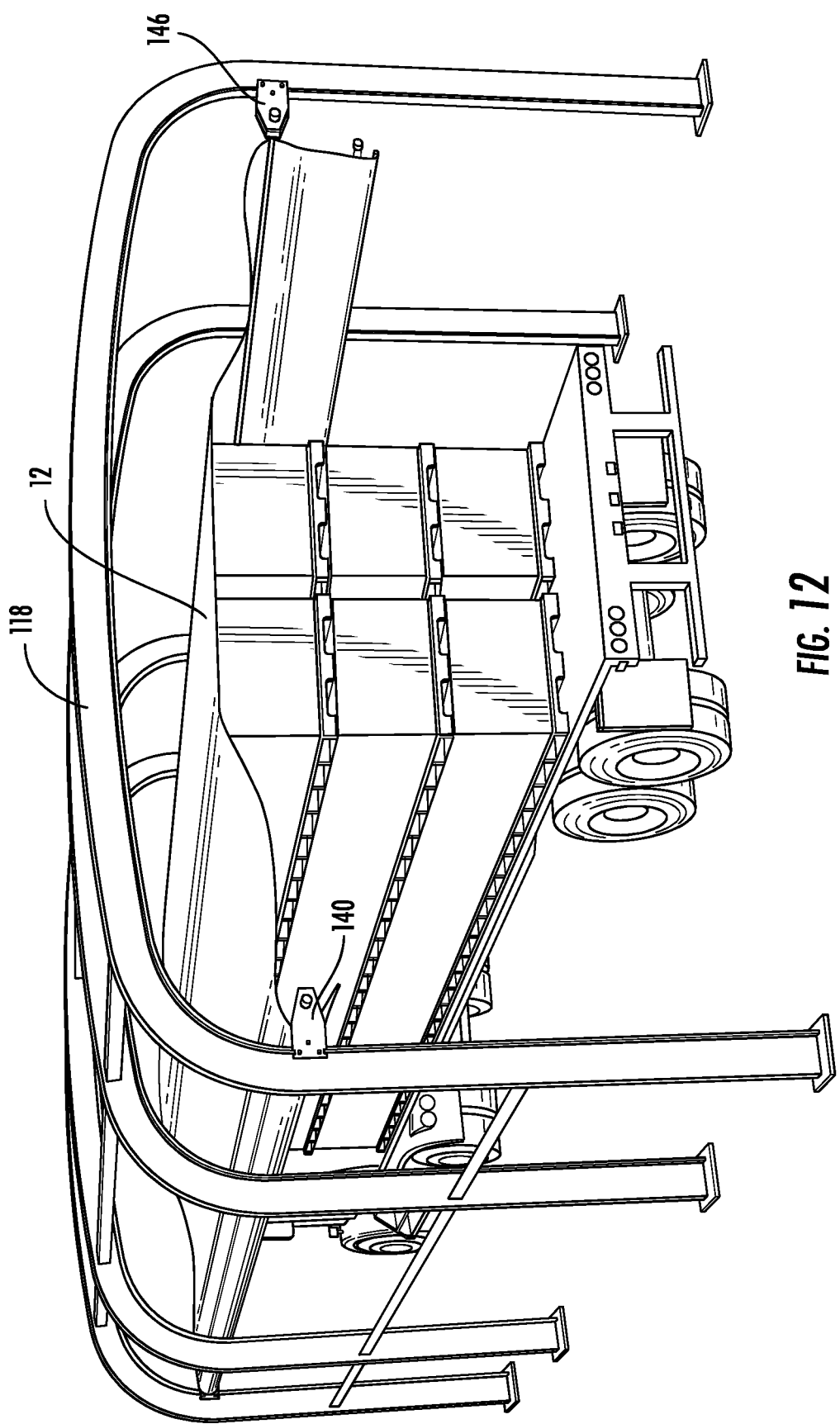
FIG. 12 is a rear perspective view of the container tarping assembly of FIG. 8 in operation.

First and second spreader assemblies 132 and 134 are also provided. Spreader assembly 132 comprises a spreader bar 136 extending between travelers 138 and 140. Spreader assembly 134 comprises a spreader bar 142 extending between travelers 144 and 146 (FIG. 12). As one skilled in the art will appreciate, spreader bars 136 and 142 may comprises multiple bar sections connected together. Travelers 138 and 144 move in opposite directions along frame member 112 between first and second limits. Travelers 140 and 146 similarly move in opposite directions along frame member 118. In their initial positions, spreader bars 136 and 142 will be located above and lateral to the sides of container 120 when it is positioned for tarping. In addition, travelers 138, 140, 144, and 146 are configured so that carrier bar 130 can pass between spreader bars 132 and 134 and the inner surface of the frame members 114 and 116 as it moves.

Referring now to FIGS. 8-14, operation of tarping assembly 110 will be explained. In FIG. 8, carrier 124 is located in its initial position on one side of the container 120 (which corresponds to the first limit of travelers 126 and 128). Preferably, carrier 124 will be low enough to allow the tarp 12 to be connected to carrier bar 130 by one or more workers who are standing on the ground. In some cases, tarp 12 may have a series of spaced apart eyelets along one side in which respective hooks are inserted. The hooks, in turn, are connected to carrier bar 130. Spreader assemblies 132 and 134 are located in their initial positions high on the frame on respective sides of the container 120 (which corresponds to the first limits of travelers 138, 140, 144, and 146).

Figure 9:
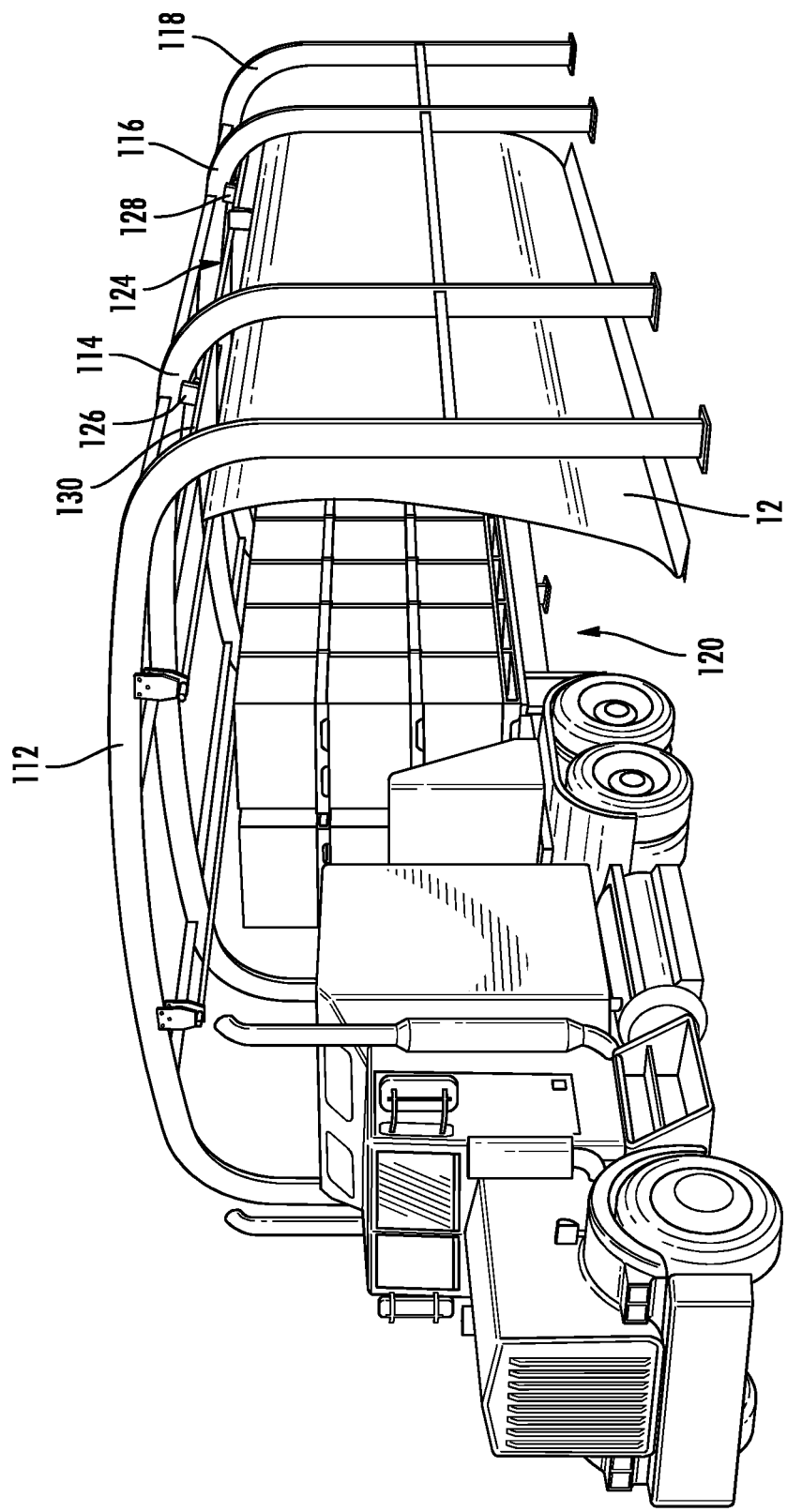
FIG. 9 is a view similar to FIG. 8 with the container tarping assembly in operation.
Figure 10:
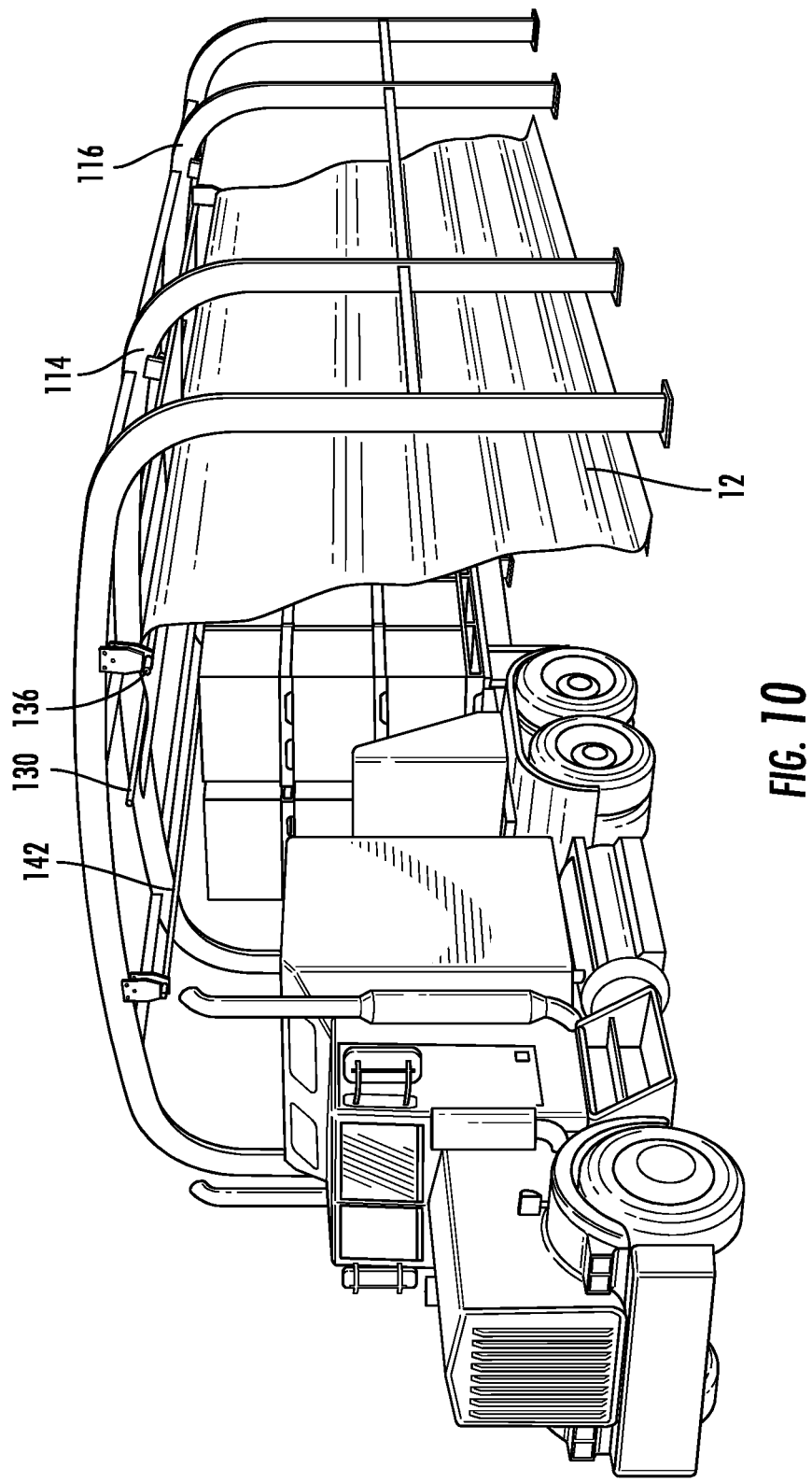
FIG. 10 is a view similar to FIG. 8 with the container tarping assembly in operation.
Figure 11:
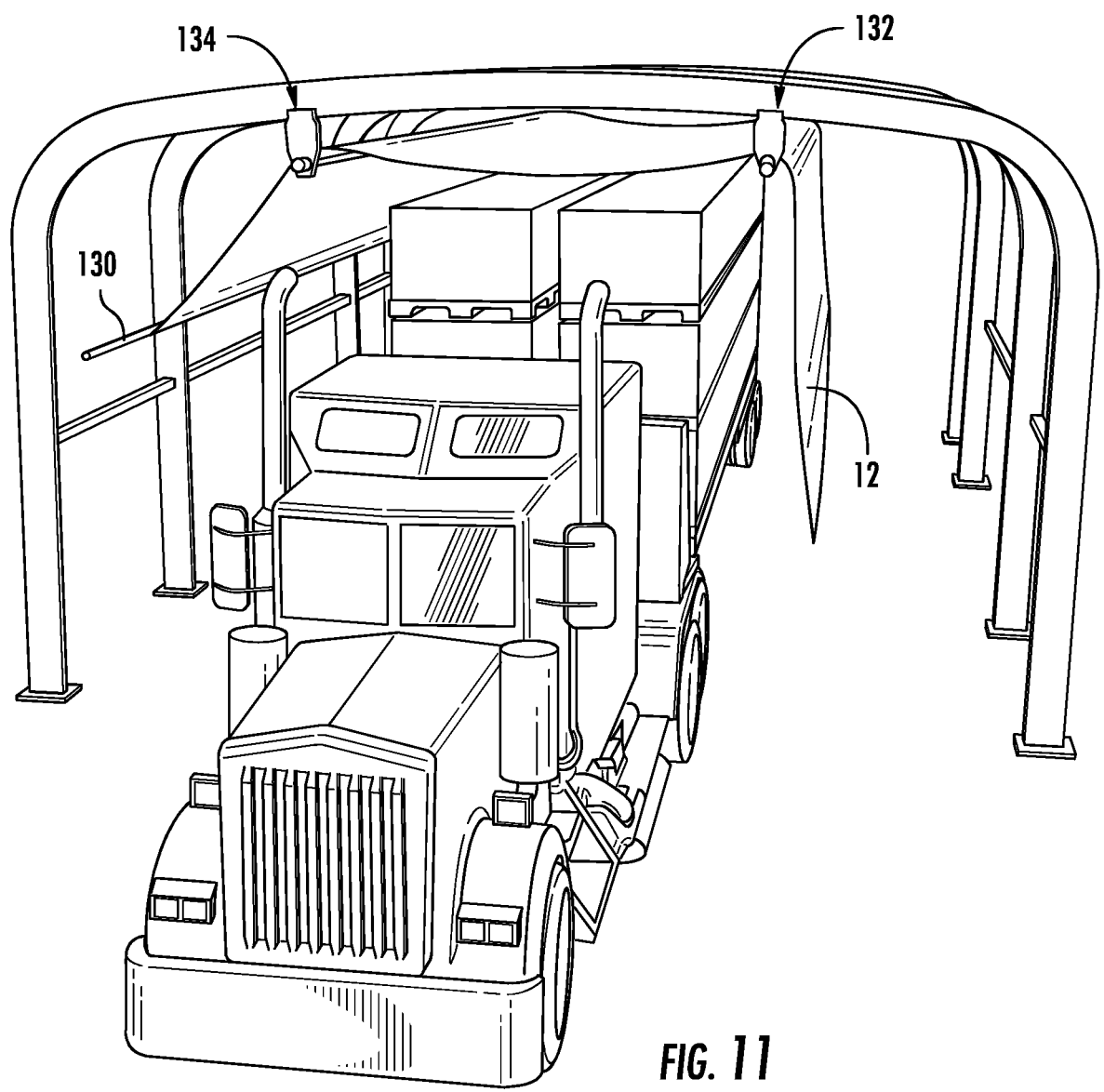
FIG. 11 is a front perspective view of the container tarping assembly of FIG. 8 in operation.

As shown in FIG. 9, carrier 124 then begins to move up and along the inside of the frame. Specifically, travelers 126 and 128 follow the shape of respective frames members 114 and 116, thus causing tarp 12 to be lifted and to spread open. This movement of carrier 124 continues, as shown in FIGS. 10 and 11, until carrier 124 is on the other side of container 120. Note that carrier 124 pulls tarp 12 into the space between the inside of the frame and spreader bars 136 and 142. As a result, tarp 12 will be draped on spreader bars 136 and 142 over the top of container 120.

Figure 13:
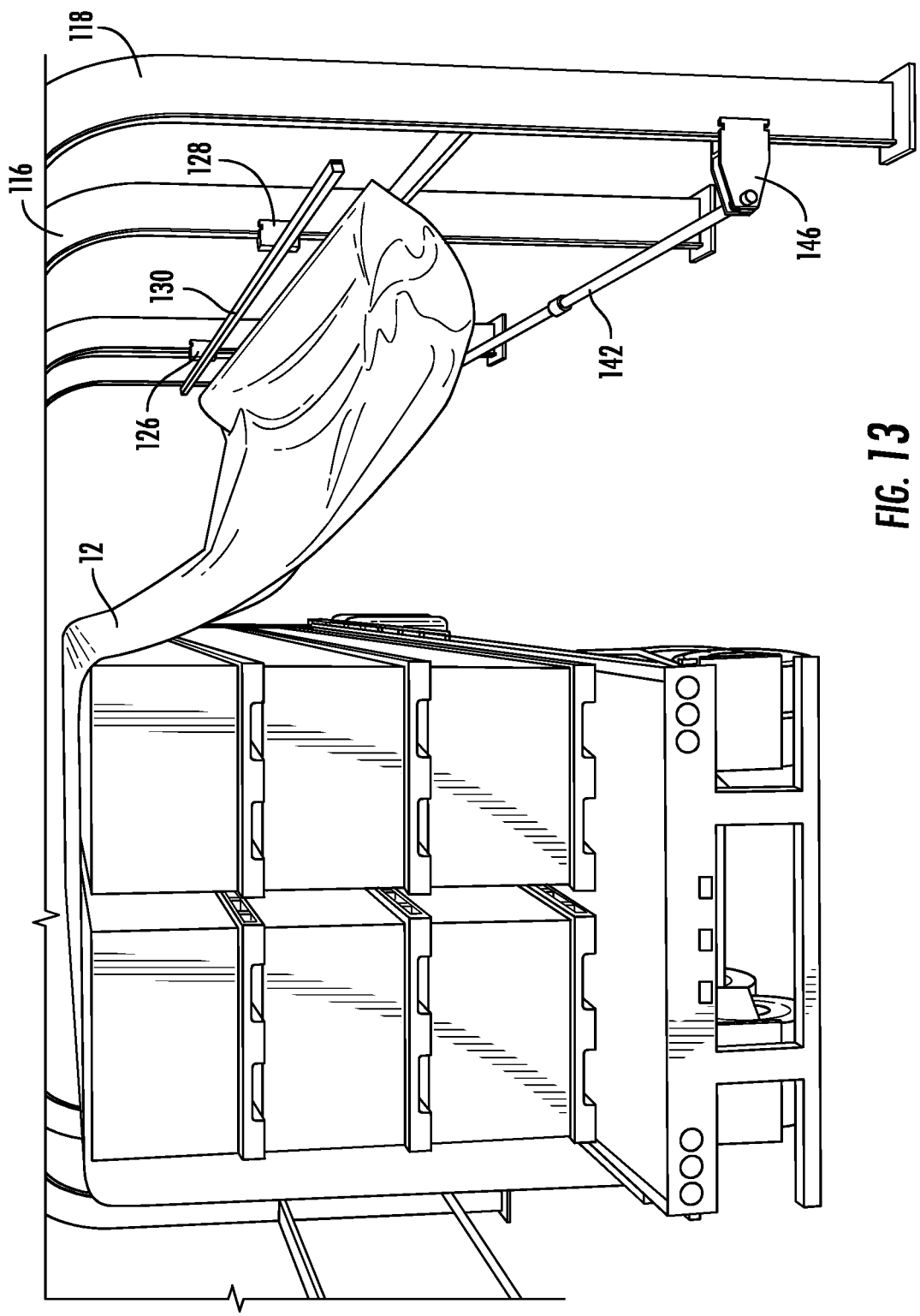
FIG. 13 is a rear perspective view of the container tarping assembly of FIG. 8 in operation.
Figure 14:
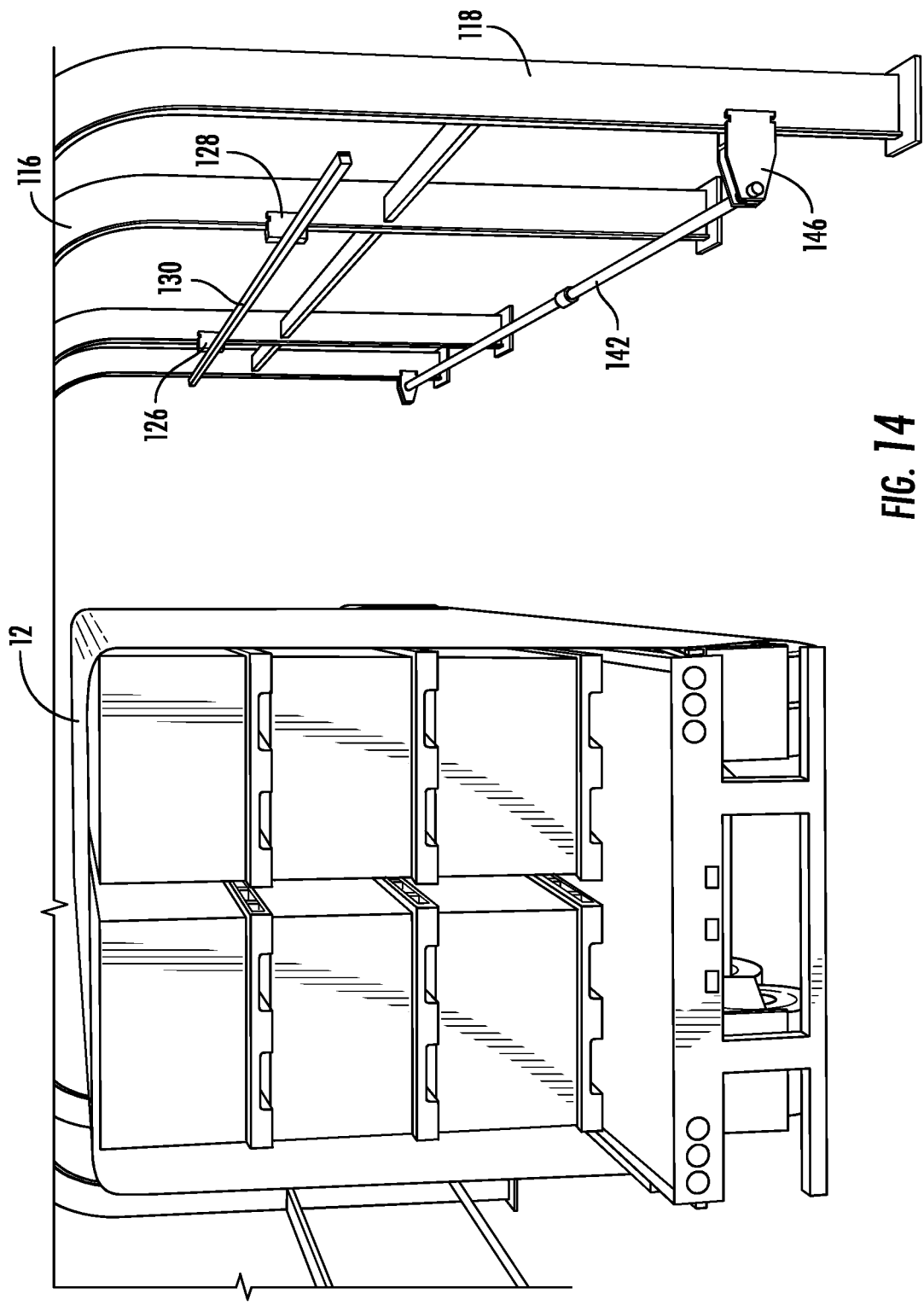
FIG. 14 is a rear perspective view of the container tarping assembly of FIG. 8 in operation.

When carrier 124 is in its extended position (corresponding to the second limit of travelers 126 and 128), spreader assemblies 132 and 134 begin to move from their initial positions. Specifically, travelers 138 and 140 move along frame members 112 and 118 in one direction outboard of container 120 while travelers 144 and 146 move along frame members 112 and 118 in the opposite direction outboard of container 120. Spreader bars 136 and 142 will thus gently lay tarp 12 onto the top surface of container 120. As spreader bars 136 and 142 move to their extended (lowest) positions (corresponding to the second limit of travelers 138, 140, 144, and 146), they will be completely clear of tarp 12. As shown in FIG. 13, one side of tarp 12 will then be draped alongside container 120. When the other side of tarp 12 is disconnected from carrier 124, it will also fall alongside container 120 (as shown in FIG. 14).

In this embodiment, tarp 12 is manually disconnected from carrier bar 130 by one or more workers standing on the ground. In other embodiments, tarp 12 may be connected to carrier bar 130 so as to disconnect in automatic or semiautomatic fashion. For example, mechanisms are contemplated in which movement of spreader bar 142 causes the disconnection. In any event, tarp 12 is then suitably secured to the container for transport. Carrier 124, spreader assembly 132, and spreader assembly 134 are then moved back to their initial positions to await the next tarping operation.

Figure 15:
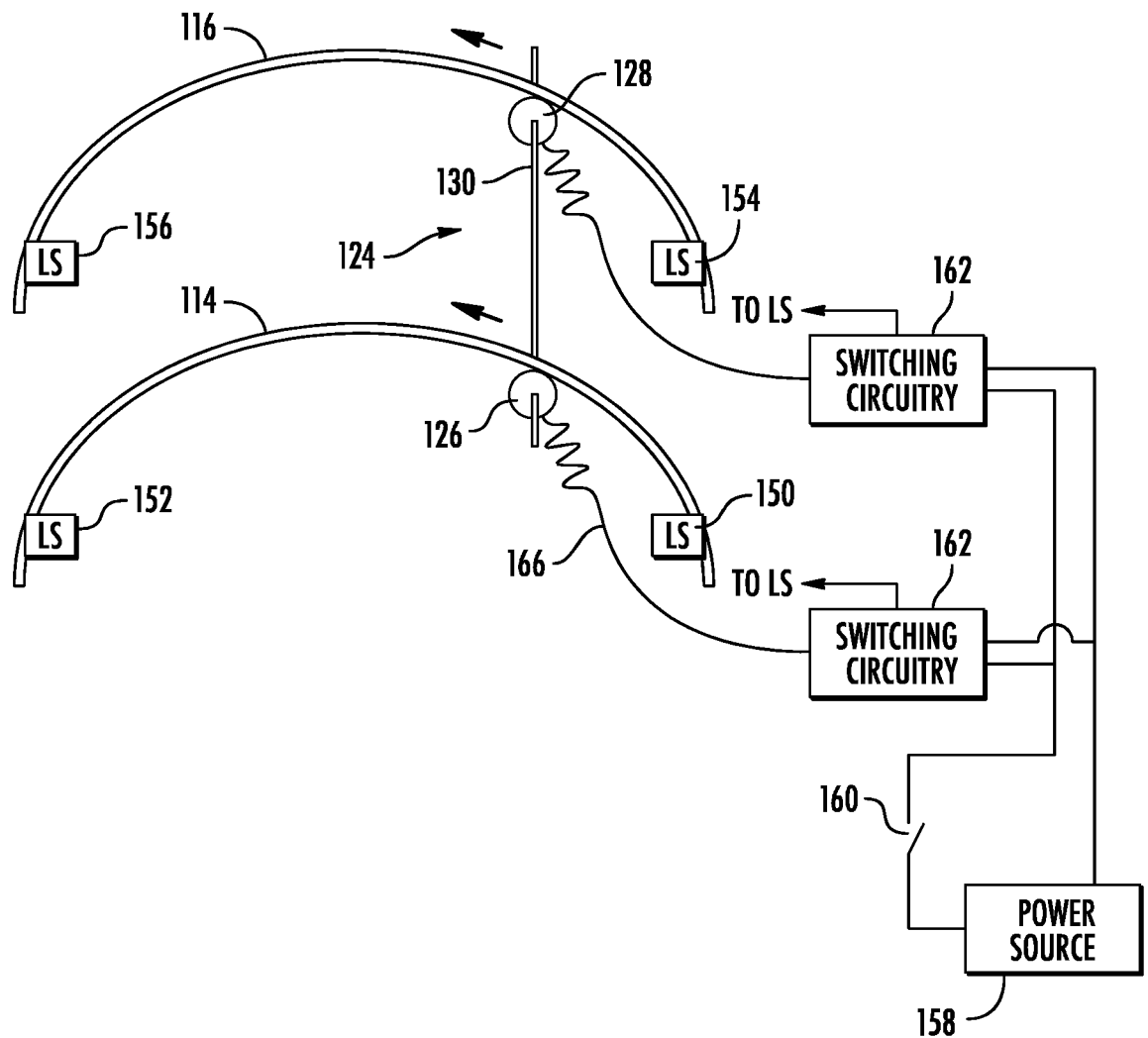
FIG. 15 is a diagrammatic representation showing operation of the tarp carrier in accordance with the embodiment of FIG. 8.

Referring now to FIG. 15, the operation of carrier 124 as configured in this embodiment will be explained. Travelers 126 and 128 may each comprises a suitable drive mechanism that causes it to travel along frame members 114 and 116 between the first and second limits. For example, travelers 126 and 128 may each have a respective motor with a sprocket or other suitable device that engages the corresponding frame member. For example, the motor may have a sprocket that engages a length of chain that is welded or otherwise affixed to a surface of the frame member. One or more wheels may also be affixed to the traveler to guide it along the frame member. In this regard, travelers according to one exemplary embodiment utilize wheels on the upper surface of the inner axial flange of the frame member's I-beam structure.

The path of travel of traveler 126 is defined by first and second limit switches 150 and 152. Similarly, the path of travel of traveler 128 is defined by first and second limit switches 154 and 156. A power source 158 and a common switch 160 are connected to the respective motor of each traveler through respective switching circuitry 162. Each such switching circuitry 162 is in electrical communication with the associated limit switches ("To LS") and also to the motor of the associated traveler, such as via a flexible power cord (e.g., cord 166). Each of the motors is capable of rotation in either clockwise or counterclockwise directions in order to cause the back and forth movement of the associated traveler. In this embodiment, switch 160 is a momentary switch (e.g., a spring-loaded contact switch) that, when closed, energizes the switching circuitry 162 associated with each motor. The switching circuitry will then cause the motor to rotate in a direction so that the traveler moves away from whichever limit switch it is engaging when switch 160 is closed. The traveler will continue until it engages the opposite limit switch, at which time power to the motor will again be cut off. The process repeats when switch 160 is closed again, with the motors rotating in the opposite rotational direction so that the travelers will move in the opposite longitudinal direction from the previous stroke.

Figure 16:
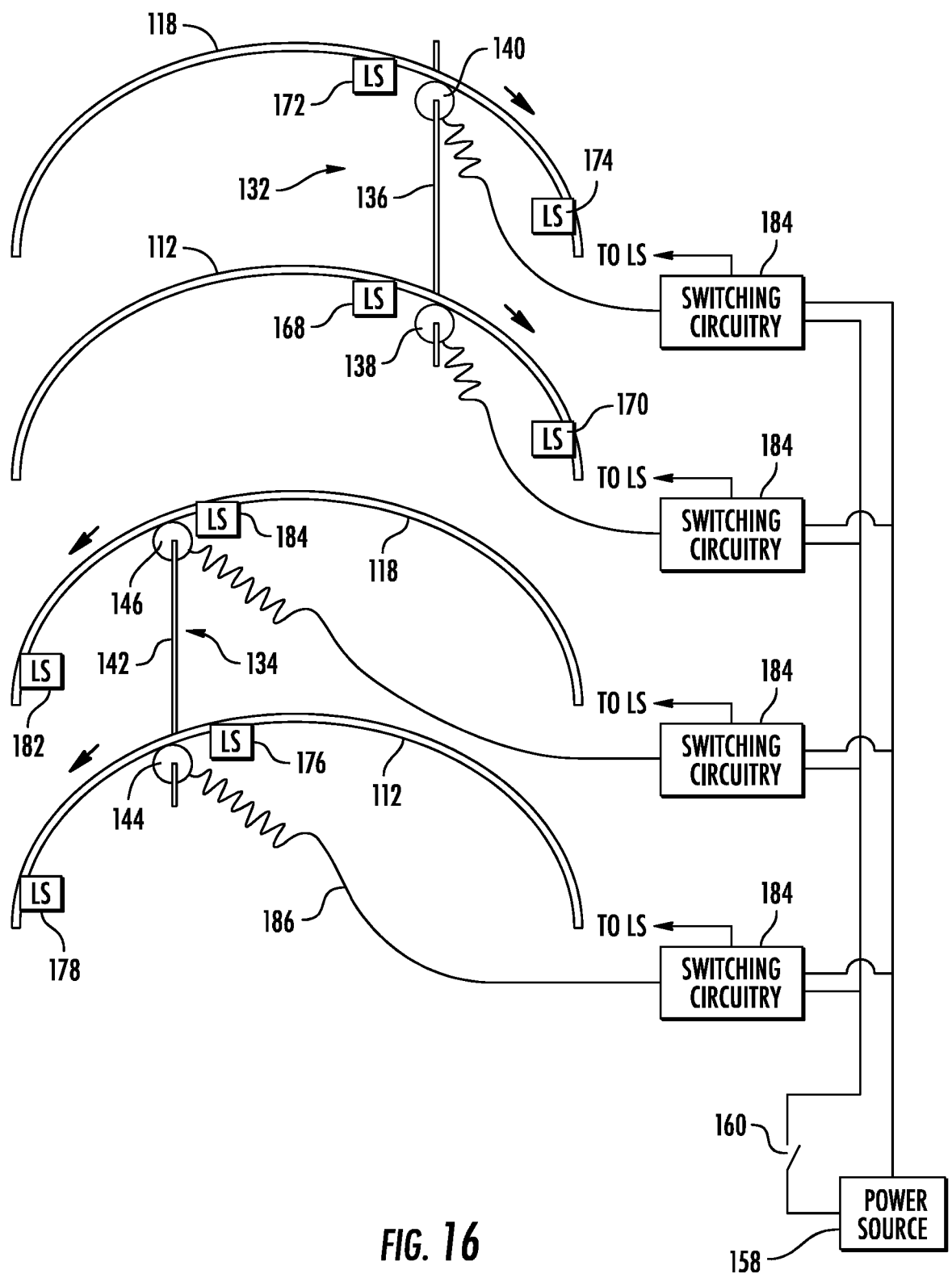
FIG. 16 is a diagrammatic representation showing operation of the spreader assemblies in accordance with the embodiment of FIG. 8.

Certain aspects of the operation of spreader assemblies 132 and 134 will now be described with reference to FIG. 16. Travelers 138, 140, 144, and 146 may be constructed and operate similarly to travelers 126 and 128 discussed above. In this regard, the path of travel of traveler 138 is defined by first and second limit switches 168 and 170. The path of travel of traveler 140 is defined by first and second limit switches 172 and 174. The path of travel of traveler 144 is defined by first and second limit switches 176 and 178. The path of travel of traveler 140 is defined by first and second limit switches 180 and 182. As can be seen, the initial position of each of these travelers, corresponding to the first limit switch, is higher up along the associate frame member 112 or 118 than the extended position. The spreader assemblies 132 and 134 thus move in opposite directions toward their extended positions. (Note that frame members 112 and 118 are duplicated in FIG. 18 purely for the sake of illustration.)

Respective switching circuitry 184 are each in electrical communication with the associated limit switches ("To LS") and also to the motor of the associated traveler, such as via a flexible power cord (e.g., cord 186). Like the motors of travelers 126 and 128, each of these motors is capable of rotation in either clockwise or counterclockwise directions in order to cause the back and forth movement of the associated traveler. Power to the switching circuitry may be supplied by power source 158 and common switch 160, described above. As one skilled in the art will appreciate, switching circuitry 184 is preferably configured to delay movement of spreader bars 136 and 142 from the initial position to the extended position until after carrier bar 130 is in its extended position on the other side of container 120 from its initial position. This delay can be achieved in a number of ways, such as by detecting activation of limit switches 152 and 156, or a simple time delay. After the tarp is secured to the container, carrier bar 130, spreader bar 136, and spreader bar 142 can be returned to the initial positions simultaneously.

Even if motors of the above-described travelers are similarly constructed, there will be some variation in their rotational speed and torque due to manufacturing tolerances and other factors. A sophisticated networking scheme may be employed to ensure that all motors are continuously operating with exact synchronization. Of course, such a scheme will add cost and complexity to the overall system, and would typically require initial and subsequent calibrations in order to operate properly. The above-described embodiments avoid the need for continuous synchronization through the use of limit switches at each end of the travel path. This is because the motors do operate at approximately the same speed and move to the same terminal locations each time. Thus, the motors synchronize themselves automatically every half-cycle without the need for a feedback-based continuous synchronization arrangement.

Those skilled in the art should appreciate that the above description provides a novel container tarping assembly. While preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

What is claimed is:

1. A tarping assembly for applying a tarp to a container, said assembly comprising:
   a first left upright and a first right upright spaced apart from each other;
   a second left upright and a second right upright spaced apart from each other;
   said first left upright being axially aligned with said second left upright and said first right upright being axially aligned with said second right upright such that the container may be received between said left uprights and said right uprights;
   said first left upright and said first right upright respectively having a first left traveler and first right traveler opposed to each other;
   said second left upright and said second right upright respectively having a second left traveler and second right traveler opposed to each other;
   said travelers each being movable in reciprocating fashion between a lower limit and an upper limit;
   a left spreader assembly connected to the first left traveler and the second left traveler;
   a right spreader assembly connected to the first right traveler and the second right traveler, said left and right spreader assemblies adapted to carry a tarp;
   at least one drive mechanism configured to move the first left traveler, the first right traveler, the second left traveler, and the second right traveler in the reciprocating fashion;
   said first left upright and said first right upright defining respective first left and first right slots in opposed surfaces thereof, said first left traveler being movable along said first left slot and said first right traveler being movable along said first right slot; and
   said second left upright and said second right upright defining respective second left and second right slots in opposed surfaces thereof, said second left traveler being movable along said second left slot and said second right traveler being movable along said second right slot.

2. A tarping assembly for applying a tarp to a container, said assembly comprising:
   a first left upright and a first right upright spaced apart from each other;
   a second left upright and a second right upright spaced apart from each other;
   said first left upright being axially aligned with said second left upright and said first right upright being axially aligned with said second right upright such that the container may be received between said left uprights and said right uprights;
   said first left upright and said first right upright respectively having a first left traveler and first right traveler opposed to each other;
   said second left upright and said second right upright respectively having a second left traveler and second right traveler opposed to each other;
   said travelers each being movable in reciprocating fashion between a lower limit and an upper limit;
   a left spreader assembly connected to the first left traveler and the second left traveler;
   a right spreader assembly connected to the first right traveler and the second right traveler, said left and right spreader assemblies adapted to carry a tarp; and
   at least one drive mechanism configured to move the first left traveler, the first right traveler, the second left traveler, and the second right traveler in the reciprocating fashion;
   wherein said at least one drive mechanism comprises respective drive mechanisms associated with said first left upright, said first right upright, said second left upright, and said second right upright.

3. A tarping assembly as set forth in claim 2, wherein each of said respective drive mechanisms comprises a bidirectional motor and linkage arrangement, said linkage arrangement translating rotational movement into reciprocating linear movement of an associated one of said travelers.

4. A tarping assembly as set forth in claim 3, wherein the linkage arrangement of each of said drive mechanisms comprises a continuous chain extending around a pair of sprockets.

5. A tarping assembly as set forth in claim 4, wherein the continuous chain of each of said drive mechanisms is located entirely within an associated one of said uprights.

6. A tarping assembly as set forth in claim 3, comprising upper and lower limit switches carried by each of the uprights, said limit switches operative to cut off power to the motor when engaged by the associated traveler.

7. A tarping assembly as set forth in claim 6, further comprising a common switching mechanism which operates to initiate movement of all of the travelers away from an adjacent one of the limit switches.

8. A tarping assembly as set forth in claim 1, wherein:
   said left spreader assembly comprises an elongate left spreader bar carrying a left hanger structure adapted to support the tarp; and
   said right spreader assembly comprises an elongate right spreader bar carrying a right hanger structure adapted to support the tarp.

9. A tarping assembly as set forth in claim 8, wherein the left hanger structure and the right hanger structure each comprise a taut line coated with an elastomeric material.

10. A tarping assembly as set forth in claim 1, further comprising a first cross-beam connecting said first left upright and said first right upright and a second cross-beam connecting said second left upright and said second right upright.

11. A container tarping assembly comprising:
   a frame structure having four uprights;
   a left spreader assembly and a right spreader assembly adapted to carry a tarp;
   said left spreader assembly including first and second left travelers;
   said right spreader assembly including first and second right travelers;
   said travelers each being connected to a respective one of said uprights such that said first left traveler and said first right traveler are opposed to one another and said second left traveler and said second right traveler are opposed to one another, said travelers being movable in reciprocating fashion along a predetermined path between a first limit and a second limit; and
   a plurality of drive mechanisms respectively associated with said travelers to move said traveler in the reciprocating fashion, each of said drive mechanisms having a bidirectional motor.

12. A container tarping assembly as set forth in claim 11, wherein each of said drive mechanisms comprises a linkage arrangement translating rotational movement into reciprocating longitudinal movement of an associated one of said travelers.

13. A container tarping assembly comprising:
   a frame structure;
   a left spreader assembly and a right spreader assembly adapted to carry a tarp;
   said left spreader assembly including first and second left travelers;
   said right spreader assembly including first and second right travelers;
   said travelers each being movable in reciprocating fashion along a predetermined path between a first limit and a second limit;
   a plurality of drive mechanisms respectively associated with said travelers to move said traveler in the reciprocating fashion, each of said drive mechanisms having a bidirectional motor, and
   wherein the linkage arrangement of each of said drive mechanisms comprises a continuous chain extending around a pair of sprockets.

14. A container tarping assembly comprising:
   a frame structure;
   a left spreader assembly and a right spreader assembly adapted to carry a tarp;
   said left spreader assembly including first and second left travelers;
   said right spreader assembly including first and second right travelers;
   said travelers each being movable in reciprocating fashion along a predetermined path between a first limit and a second limit;
   a plurality of drive mechanisms respectively associated with said travelers to move said traveler in the reciprocating fashion, each of said drive mechanisms having a bidirectional motor, and
   wherein said left spreader assembly and said right spreader assembly travel towards and away from each other along arcuate paths.

15. A container tarping assembly as set forth in claim 14, further comprising a carrier operative to move the tarp onto the spreader bar assemblies.

16. A container tarping assembly as set forth in claim 15, wherein said carrier includes at least one traveler movable in reciprocating fashion along a predetermined path between a first limit and a second limit.

17. A container tarping assembly as set forth in claim 16, wherein said at least one traveler moves above spreader bars of said first and second spreader assemblies an along an arcuate path.

18. A container tarping assembly as set forth in claim 16, wherein said carrier includes first and second travelers to which a carrier bar is connected.

19. A container tarping assembly as set forth in claim 11, further comprising a common switching mechanism which operates to initiate movement of all of the travelers away from an adjacent one of the limit switches.

20. A container tarping assembly as set forth in claim 11, comprising:
   a frame structure;
   a left spreader assembly and a right spreader assembly adapted to carry a tarp;
   said left spreader assembly including first and second left travelers;
   said right spreader assembly including first and second right travelers;
   said travelers each being movable in reciprocating fashion along a predetermined path between a first limit and a second limit;
   a plurality of drive mechanisms respectively associated with said travelers to move said traveler in the reciprocating fashion, each of said drive mechanisms having a bidirectional motor, and
   wherein said frame structure comprises at least three U-shaped frame members.

21. A container tarping assembly as set forth in claim 20, wherein each of said travelers comprises a respective one of said bidirectional motors and associated sprocket wheel, the sprocket wheel having teeth engaging a structure of an associated frame member.

22. A container tarping assembly as set forth in claim 21, wherein said teeth of said sprocket engage a length of chain attached to said frame member.

23. A container tarping assembly as set forth in claim 11, wherein:
   said left spreader assembly comprises an elongate left spreader bar carrying a left hanger structure adapted to support the tarp; and
   said right spreader assembly comprises an elongate right spreader bar carrying a right hanger structure adapted to support the tarp.

24. A container tarping assembly as set forth in claim 23, wherein the left hanger structure and the right hanger structure each comprise a taut line coated with an elastomeric material.

25. A container tarping assembly for applying a tarp to a container, said tarping assembly comprising:
   a frame structure including at least three U-shaped frame members axially aligned to define an open area in which the container to be tarped can be positioned;
   a left spreader assembly and a right spreader assembly, each of said left and right spreader assemblies having first and second travelers between which a respective spreader bar extends;
   said travelers of said left and right spreader assemblies being movable in reciprocating fashion along a respective arcuate path along an associated one of said frame members between a first limit and a second limit, wherein said left spreader assembly and said right spreader assembly travel towards and away from each other along said arcuate paths; and a carrier operative to move the tarp onto the spreader assemblies.

26. A container tarping assembly as set forth in claim 25, wherein said carrier includes at least one traveler movable in reciprocating fashion along an arcuate path along an associated one of said frame members predetermined path between a first limit and a second limit.

27. A container tarping assembly as set forth in claim 26, wherein said at least one traveler moves between spreader bars of said spreader assemblies and an inside surface of at least one of said frame members.

28. A container tarping assembly as set forth in claim 26, wherein each of said travelers has a drive mechanism to move said traveler back and forth along the associated arcuate path.

29. A container tarping assembly as set forth in claim 28, wherein each of the drive mechanisms has a bidirectional motor.

30. A container tarping assembly as set forth in claim 26, wherein each of said travelers comprises a motor and associated sprocket wheel, the sprocket wheel having teeth engaging a structure of an associated frame member.

31. A container tarping assembly as set forth in claim 30, wherein said teeth of said sprocket engage a length of chain attached to said frame member.

32. A container tarping assembly as set forth in claim 26, wherein said carrier includes first and second travelers to which a carrier bar is connected.

33. A container tarping assembly as set forth in claim 26, further comprising a common switching mechanism which operates to initiate movement of all of the travelers.

34. A method comprising steps of:
(a) providing a container tarping assembly having:
a frame structure;
a left spreader assembly and a right spreader assembly adapted to carry a tarp;
first and second left travelers connected to said left spreader assembly;
first and second right travelers connected to said right spreader assembly;
said travelers each being movable in reciprocating fashion along a predetermined path between a first limit and a second limit; and
a plurality of drive mechanisms respectively associated with an associated one of said travelers to move said traveler in the reciprocating fashion, each of said drive mechanisms having a bidirectional motor;
(b) activating said motors in a first rotational direction so that said travelers move in a first longitudinal direction until the second limit is reached; and
(c) activating said motors in a second rotational direction so that said travelers move in a second longitudinal direction until the first limit is reached.

* * * * *